Feb. 11, 1958  L. D. HAGENBOOK  2,823,024
BORING TYPE MINER PROVIDED WITH PERCUSSIVE TOOL
Filed Dec. 14, 1956  3 Sheets-Sheet 1

INVENTOR.
Loy D. Hagenbook
BY
Murray G. Gleeson
ATTORNEY

Feb. 11, 1958     L. D. HAGENBOOK     2,823,024
BORING TYPE MINER PROVIDED WITH PERCUSSIVE TOOL

Filed Dec. 14, 1956     3 Sheets-Sheet 3

*INVENTOR.*
Loy D. Hagenbook
BY
Murray G. Gleeson
ATTORNEY

United States Patent Office 2,823,024
Patented Feb. 11, 1958

2,823,024

BORING TYPE MINER PROVIDED WITH PERCUSSIVE TOOL

Loy D. Hagenbook, Chicago, Ill., assignor to Goodman Manufacturing Company, Chicago, Ill., a corporation of Illinois Application December 14, 1956, Serial No. 628,414

4 Claims. (Cl. 262—7)

This invention relates to boring type miners and particularly to the improved miner having means for removing the core or cusp formed between a pair of boring arms.

The present day boring type miner generally has a pair of boring arms rotating in overlapping paths so as to leave upper and lower cusps which are removed by upper and lower cutter chains. The upper cusp will generally fragment by its fall to the mine floor, but the lower cusp may remain as a solid mass after having the kerf cut along the bottom thereof, its size being such that it is too large to enter the throat of the cuttings conveyor of the machine.

One of the problems of mining with a boring type miner in low coal is that, as the height of the machine decreases, the width of the machine also decreases if the conventional boring head with boring arms rotating in overlapping orbits is employed. On the other hand, a boring head having four boring arms in order to obtain the desired width coupled with the low height poses many problems in connection with the supporting and driving of the boring arms.

According to the present invention there is provided a single boring head having a pair of spaced boring arms extending therefrom, the spacing of the arms being such that they leave an hourglass shaped core in low coal or upper and lower cusps in high coal where the boring arms rotate in overlapping paths. Upper and lower kerf cutters, generally in the form of an endless cutter chain travelling in spaced upper and lower guides cut upper and lower kerfs in the hourglass shaped core or in the upper and lower cusps. The core or the lower cusp is fragmented by a percussive tool mounted on the boring head and arranged to be automatically operable as the core or lower cusp is built up by the advance of the boring arms. Preferably, the percussive tool, such as a jack hammer, is disposed above the cuttings conveyor located between the two boring arms, and its point of action is at approximately the geometrical center of the lower half of the core or at the lower cusp. The action of the jack hammer and the upper and lower kerf cutters is such that the core will break at its narrow neck half way between the floor and the roof, the top half of the core being broken up in part by cutter chain idler and drive sprockets, and also by the fact that the core can drop down onto the floor.

In the case of miner having overlapping boring arms the upper cusp will fragment by its fall to the mine floor, while the lower cusp will be fragmented by the percussive tool to sizes which will enable the cuttings conveyor readily to remove same.

With the foregoing considerations in mind it is a principal object of this invention to provide a boring type miner having auxiliary percussive means to fragment the core or cusp where the fragmented material may readily be removed by a cuttings conveyor disposed on such miner.

Another object is to provide an auxiliary percussive type of tool for removing the hourglass shape core formed between a non-overlapping pair of boring arms of a boring type miner, and to cause the tool to be automatically operable in accordance with the advance of the machine and the boring arms into a seam or vein.

Still another object is to provide an auxiliary cutting tool for fragmenting the lower cusp formed between a pair of non-overlapping boring arms, so that such fragmented cusp may readily be removed by the cuttings conveyor of such machine.

Other objects and important features of the invention will be apparent from a study of the specification following taken with the drawings which together show and describe a preferred embodiment of the invention and what is now considered to be the best mode of practicing the principles thereof. Other embodiments of the invention may be suggested to those having the benefits of the teachings herein and such other embodiments are intended to be reserved especially as they fall within the scope and purview of the subjoined claims.

Figure 1:
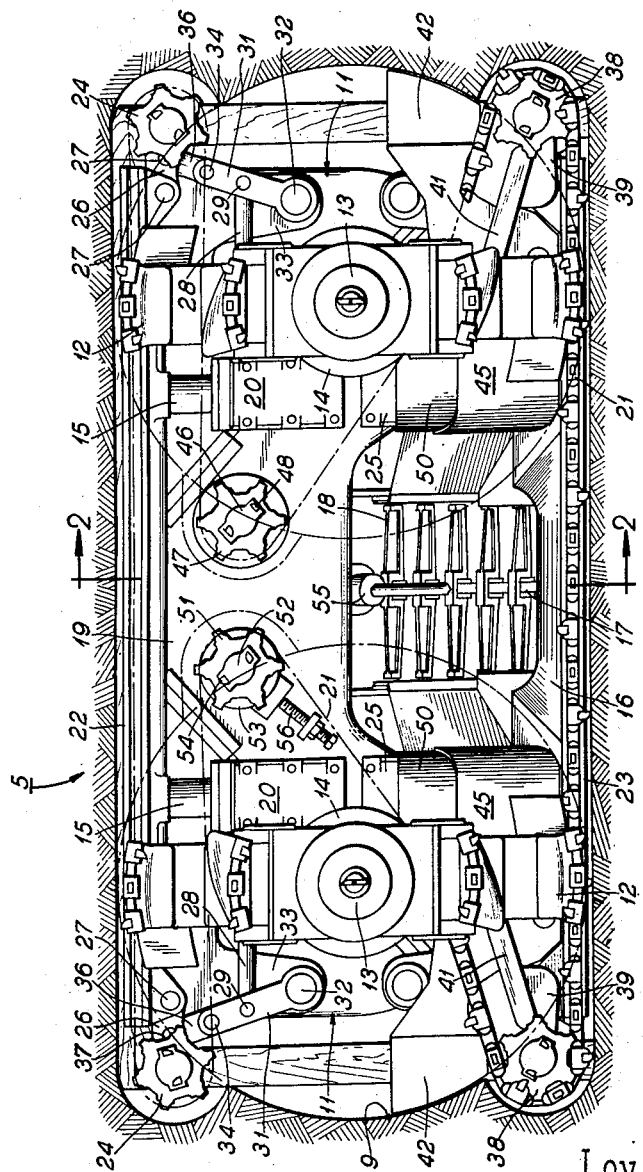
Fig. 1 is a front elevational view of a boring type miner having the improvements according to the present invention embodied therein.

Referring now to the drawings there is shown a boring type miner indicated generally by the reference numeral 5. The miner 5 includes a main frame 6 mounted upon crawler treads 7 for tramming the miner 5 and crowding same against a seam of coal or other mineral 9. The miner 5 includes a boring head 11 mounted on the main frame 6 and supporting boring arms 12 which turn in opposite directions in timed relationship to cut or fragment coal or other minerals from the solid seam 9. Each boring arm 12 is mounted on a shaft 13 turning within a shaft bearing 14 extending from the forward face of the boring head 11.

The cuttings resulting from the operation of the boring arms 12 are moved thereby to a cuttings receiving throat 16, whence they are removed by means of an endless chain cuttings conveyor 17 having flights 18.

As seen in Fig. 1, the spacing of the boring arms 12 is such as to leave therebetween an essentially hourglass shaped core 19. A kerf is cut at the top and bottom of the core 19 by means of an endless cutter chain 21 which is guided along an upper cutter chain guide 22 and a lower cutter chain guide 23. In order to provide a substantially rectangular shaped bore the upper guide 22 and the lower guide 21 are provided with idler sprockets which move into position to extend the effective length of such guides, the sprockets being retractable for removal of the machine 5 from proximity to the working face.

The miner 5 described in connection with this invention may also be of the type where the boring arms 12 overlap in their rotation so as to result in an upper depending and a lower upstanding cusp, instead of an hourglass shaped core as described herein.

The upper chain cutter guide 22 accordingly has idler sprockets 24 disposed at each end thereof, each sprocket being mounted upon an arm 26 pivoted at 27 to the end of the chain guide 22. The sprocket 24 is moved to the extended position by means of a fluid operated cylinder (not shown) having a piston rod 28 pivotally connected at 29 to a link 31, which is in turn pivoted at 32 to an extension 33 from the upper chain guide 22. The link 31 is pivotally connected at 34 to a link 36 in turn pivotally conected at 37 to the arm 26. It will be seen that the outward movement of the piston rods 28 will move the idler sprockets 24 to the position seen in Fig. 1.

The lower cutter chain guide 23 is likewise provided with an idler sprocket 38 at each end thereof, the sprocket 38 being mounted upon an arm 39 and being arranged to be moved to a retracted position by means, not shown, similar to the fluid operated piston rods 28 shown with reference to the upper sprockets 24. The arm 39 is connected by a link 41 to a pusher plate 42 as may be disclosed in Lindberg et al. application, Serial No. 488,528, filed February 16, 1955, now abandoned for Cutter Chain Takeup Mechanism for Variable Height Boring Type Miner.

Means are provided for raising and lowering the upper and lower cutter chain guides 22 and 23. The upper chain guide 22 is secured to spaced piston rods 15 movable within fixed cylinders 20 on the front of the boring head 11. The lower chain guide 23 is likewise secured to the lower end of piston rods, not shown, the piston rods moving in fixed cylinders 25 also disposed on the forward side of the boring head 11.

Figure 2:
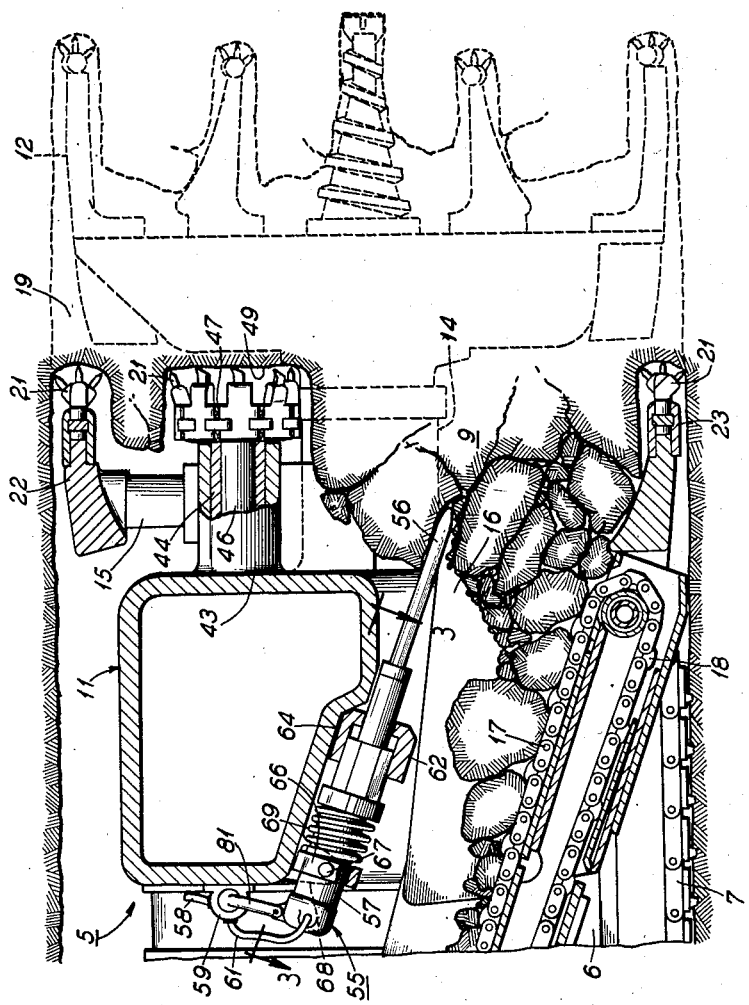
Fig. 2 is a vertical sectional view taken along the line 2—2 of Fig. 1, looking in the direction of the arrows, and showing an auxiliary percussive tool for breaking the core formed between the boring arms shown in Fig. 1.
Figure 3:
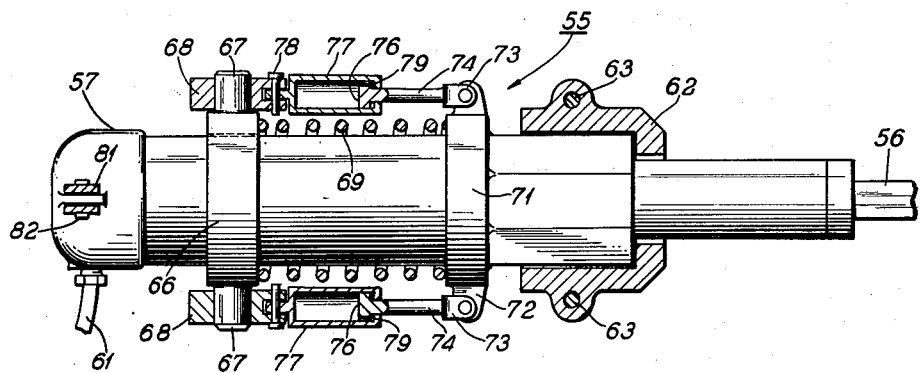
Fig. 3 is a plan view of the auxiliary percussive tool seen in Fig. 2, said view being taken in the direction of the arrows 3—3 of Fig. 2.

Means are provided for driving the endless chain 21, and to this end, see also Fig. 2, the boring head 11 has extending therefrom an annular bearing support 43 enclosing a bushing 44 and a drive shaft 46. A driving sprocket 47 is keyed to the end of shaft 46 protruding from the bearing support 43, the sprocket 47 driving the endless chain 21. Cutter bits 48 are mounted on the forward face of the driving sprockets 47 to provide clearance therefor, and the cutter chain 21 and the sprocket 47 thereby cut a kerf 49 in the core 19. Any suitable driving means within the boring head 11 may be provided for driving the shaft 46, and may be of the type as disclosed in Hagenbook application, Serial No. 541,137, filed October 18, 1955, for Boring Type Mining Machines.

The cutter chain 21 is also trained about an idler sprocket 51 mounted on a shaft 52 extending from the boring head 11 and turning within an annular bearing support 53. The sprocket 52 likewise has cutter bits 54 displaced on the forward face thereof to provide clearance for the sprocket 51. In order to take-up slack in the chain 21, the support 53 and the shaft 52 can be shifted by means of a screw adjustment 56.

The cuttings resulting from the action of the boring arms 12 are guided by a vertically movable pusher plate 45 disposed at each side of the throat 16. These pusher plates are movable with the lower chain guide 23 and are in telescoping relationship with fixed guide plates 50 secured to the front of the boring head 11.

Means are provided for fragmenting the core 19 formed between the two boring arms 12, and such means are arranged to act approximately at the geometric center of the bottom half of the hourglass core 19. Such means consist of a percussive tool, such as an air operated jack hammer, indicated generally by the reference numeral 55 and having a drill bit 56 which is reciprocated with percussive action by an air motor 57 receiving its supply of air from a supply hose 58, the supply being controlled by a valve 59 having a working line 61 therefrom connected to the air motor 57. The jack hammer 55 is supported in an annular shaped support 62 held to the boring head 11 by means of cap screws 63. A flexible pad of rubber or other resilient material 64 is interposed between the annular support 62 and the bottom face of the boring head 11 as seen in Fig. 2. The air motor 67 is also supported in a gimbal 66 having a pair of trunnions 67 mounted for pivotal support in a pair of ears 68 which depend from the lower side of the boring head 11.

A spring 69 encircles the air motor 67 and has one end bottomed against the trunnion 66, and the other end being bottomed against a collar 71 secured to the body of the air motor 57. The collar 71 has a pair of diametral ears 72, each being connected by a clevis 73 to a piston rod 74 having a piston 76 movable within a dash-pot 77. A pivoted connection 78 is provided between the ear 68 and the dash-pot 77. The piston 76 has a metering orifice 79 therein to dampen the vibrating movement of the air motor 57 with respect to the support trunnion 66.

As the miner 5 advances into the seam 9 the boring arms 12 will leave therebetween the hourglass shaped core 19 which will have upper and lower kerfs cut therein by the endless chain 21 as seen in Fig. 2. As the miner 5 advances the drill point 56 will come into contact with the unbroken core 19 as seen in Fig. 2, and the continued crowding movement of the machine 10 against the seam 9 will cause the air motor 57 to be shifted to the left against the bias of the spring 69.

Figure 4:
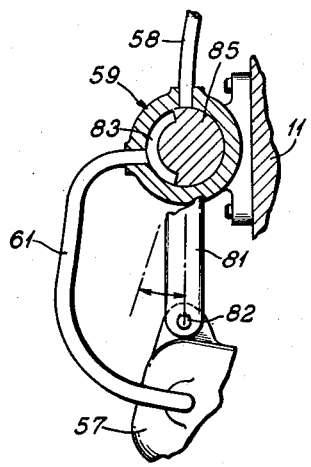
Fig. 4 is an enlarged detailed view, partly in section and partly in elevation, showing means for mounting the auxiliary percussive tool and for controlling the supply of motive fluid thereto.

A valve operating link 81 is pivotally connected at 82 to the back end of the air motor 57, and the link 81 is formed integrally with a valve member 85 within the valve housing 59, see also Fig. 4. As the air motor 57 is displaced in a rearward direction, as has been explained, the valve member 85 will be rocked in a clockwise direction and a passageway 83 therein will cause communication between the supply hose 58 and the line 61 connected to the air motor 57 to operate same in a manner well known in the art.

As has been explained, the point of application of the drill bit 56 is approximately at the geometric center of the lower half of the hourglass shaped core 19, and the same will be fragmented so that the fragmented materials will fall upon the conveyor 17. As the lower half of the hourglass shaped core disintegrates by action of the percussive tool 55, the top half of the core will fall since it will have been severed from the roof by the action of the cutter chain moving in the upper guide 22.

From the foregoing description it will be evident that there has been provided a new and improved form of boring type miner, particularly adaptable for use in low seams. The hourglass shaped core resulting from the relatively wide spacing of the boring arms can be readily removed by the percussive tool mounted on the boring head 11 and disposed in position above the cuttings conveyor 17.

In cases where the miner has boring arms which cut overlapping bores, the percussive tool is arranged to fragment the lower upstanding cusp so that the fragmented material can readily be received at the cuttings receiving throat. Accordingly, in the claims where the percussive tool is described as operating against a core, it is intended that a cusp remaining from the action of the boring arms be embraced thereby.

While the invention has been described in terms of a preferred embodiment its scope is intended to be reserved only by the claims here appended.

I claim as my invention:

1. In a boring type miner, a main frame having means for advancing same along a mine floor, a boring head mounted on said main frame and having a pair of boring arms extending therefrom arranged to cut bores in a seam of coal or the like, upper and lower cutting means for cutting upper and lower kerfs in the material remaining from the action of said boring arms, a material receiving throat in said boring head disposed between said boring arms and below the turning centers thereof, a cuttings conveyor arranged to remove fragmented material from said material receiving throat, a percussive tool disposed in said throat above said cuttings conveyor for fragmenting solid material lodged in said throat, and means operable by contact of said percussive tool with the material lodged in said material receiving throat for causing operation of said percussive tool.

2. In a boring type miner, a main frame having means for advancing same along a mine floor, a boring head mounted on said main frame and having a pair of boring arms extending therefrom arranged to cut bores in a seam of coal or the like, upper and lower cutting means for cutting upper and lower kerfs in the material remaining from the action of said boring arms, a material receiving throat in said boring head disposed between said boring arms and below the turning centers thereof, a cuttings conveyor arranged to remove fragmented material from said material receiving throat, a percussive tool disposed in said throat above said cuttings conveyor for fragmenting solid material lodged in said throat, a valve controlling the entrance of motive fluid to said percussive tool, and means operable by the translative movement of said percussive tool when impinging against the material lodged in said throat for actuating said valve.

3. In a boring type miner, a main frame having means for advancing same along a mine floor, a boring head mounted on said main frame and having a pair of boring arms extending therefrom arranged to cut bores in a seam of coal or the like, upper and lower cutting means for cutting upper and lower kerfs in the material remaining from the action of said boring arms, a material receiving throat in said boring head disposed between said boring arms and below the turning centers thereof, a cuttings conveyor arranged to remove fragmented material from said material receiving throat, a percussive tool disposed in said throat above said cuttings conveyor for fragmenting solid material lodged in said throat, and valve means operable by the advance of said miner against said seam and by the translative movement of said percussive tool during said advance for supplying motive fluid to said percussive tool for causing operation of the same.

4. In a boring type miner, a main frame having means for advancing same along a mine floor, a boring head mounted on said main frame and having a pair of boring arms extending therefrom arranged to cut bores in a seam of coal or the like, upper and lower cutting means for cutting upper and lower kerfs in the material remaining from the action of said boring arms, a material receiving throat in said boring head disposed between said boring arms and below the turning centers thereof, a cuttings conveyor arranged to remove fragmented material from said material receiving throat, and a percussive tool disposed in said throat above said cuttings conveyor for fragmenting solid material lodged in said throat.

References Cited in the file of this patent
UNITED STATES PATENTS

| | | |
|---|---|---|
| 1,880,337 | App | Oct. 4, 1932 |
| 2,694,562 | Snyder et al. | Nov. 16, 1954 |